Aug. 18, 1925.
C. C. REASONER ET AL
1,550,569
COMBINED WEIGHING AND HOISTING APPARATUS
Filed April 7, 1921  3 Sheets-Sheet 1
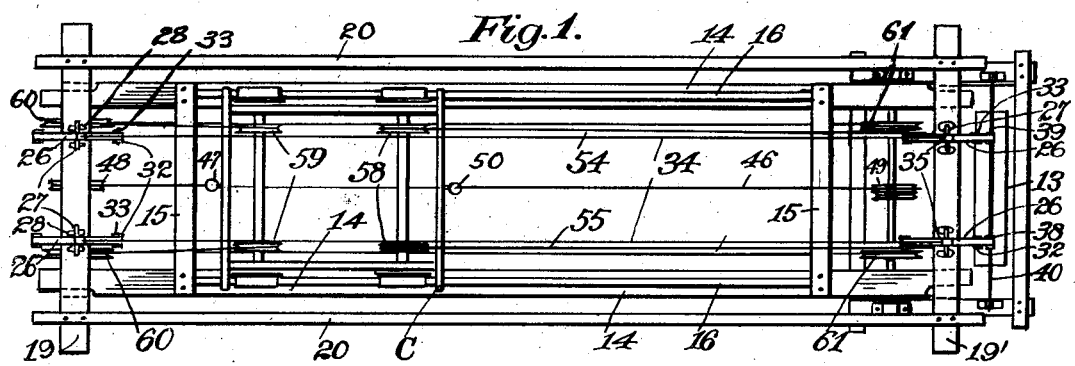
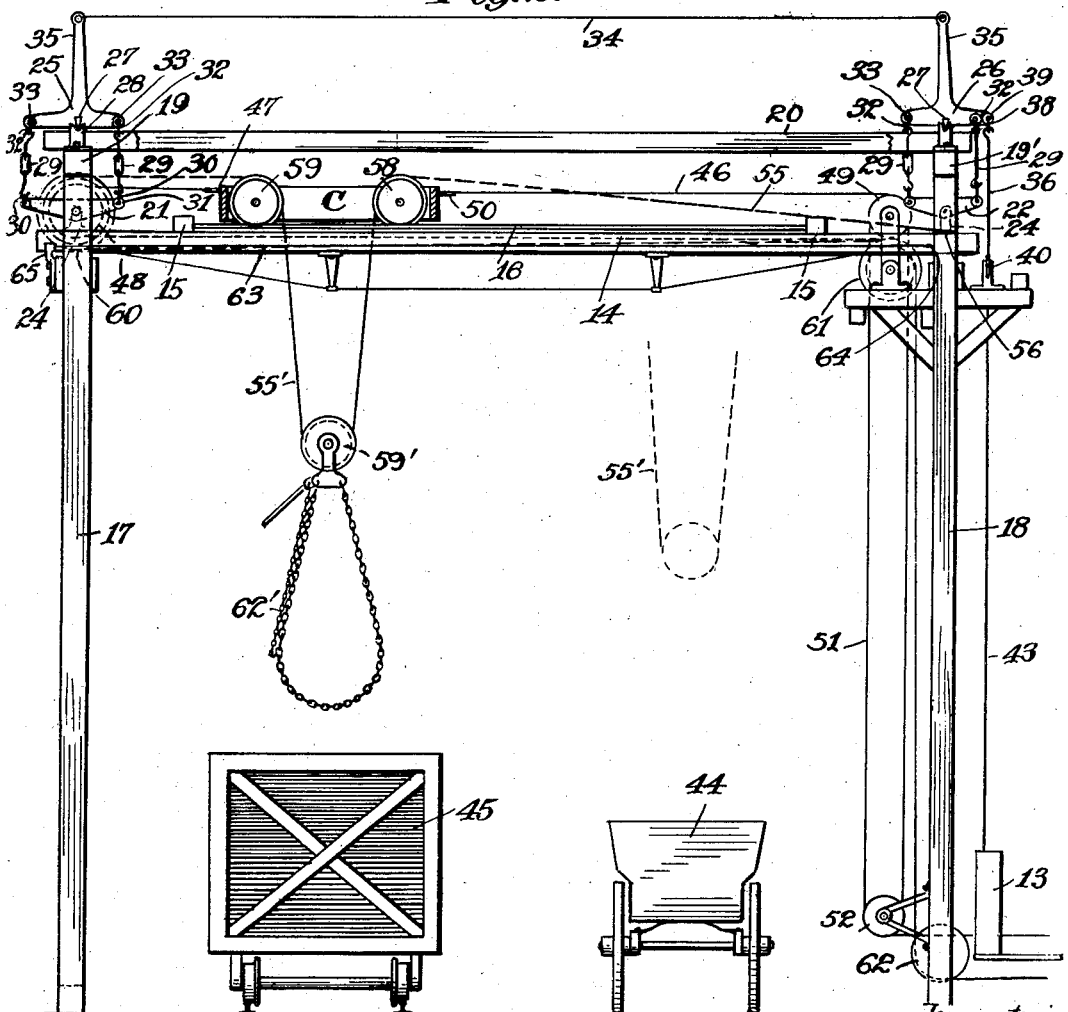
Inventors
C. C. Reasoner
H. L. Merrick
By their Attorney
John O. Seifert Aug. 18, 1925. 1,550,569
C. C. REASONER ET AL
COMBINED WEIGHING AND HOISTING APPARATUS
Filed April 7, 1921 3 Sheets-Sheet 2
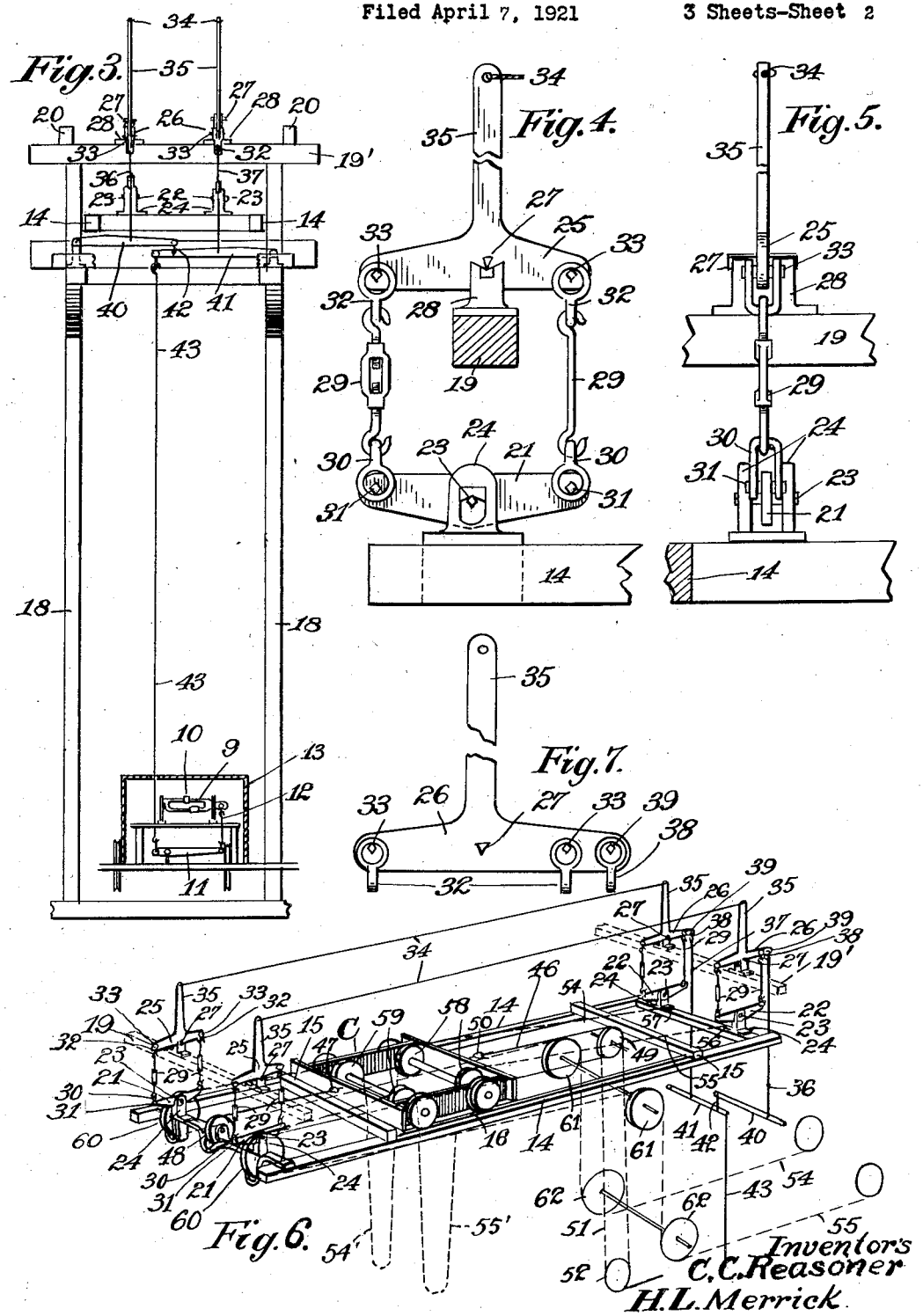
Inventors
C. C. Reasoner
H. L. Merrick
By their Attorney
John O. Seifert

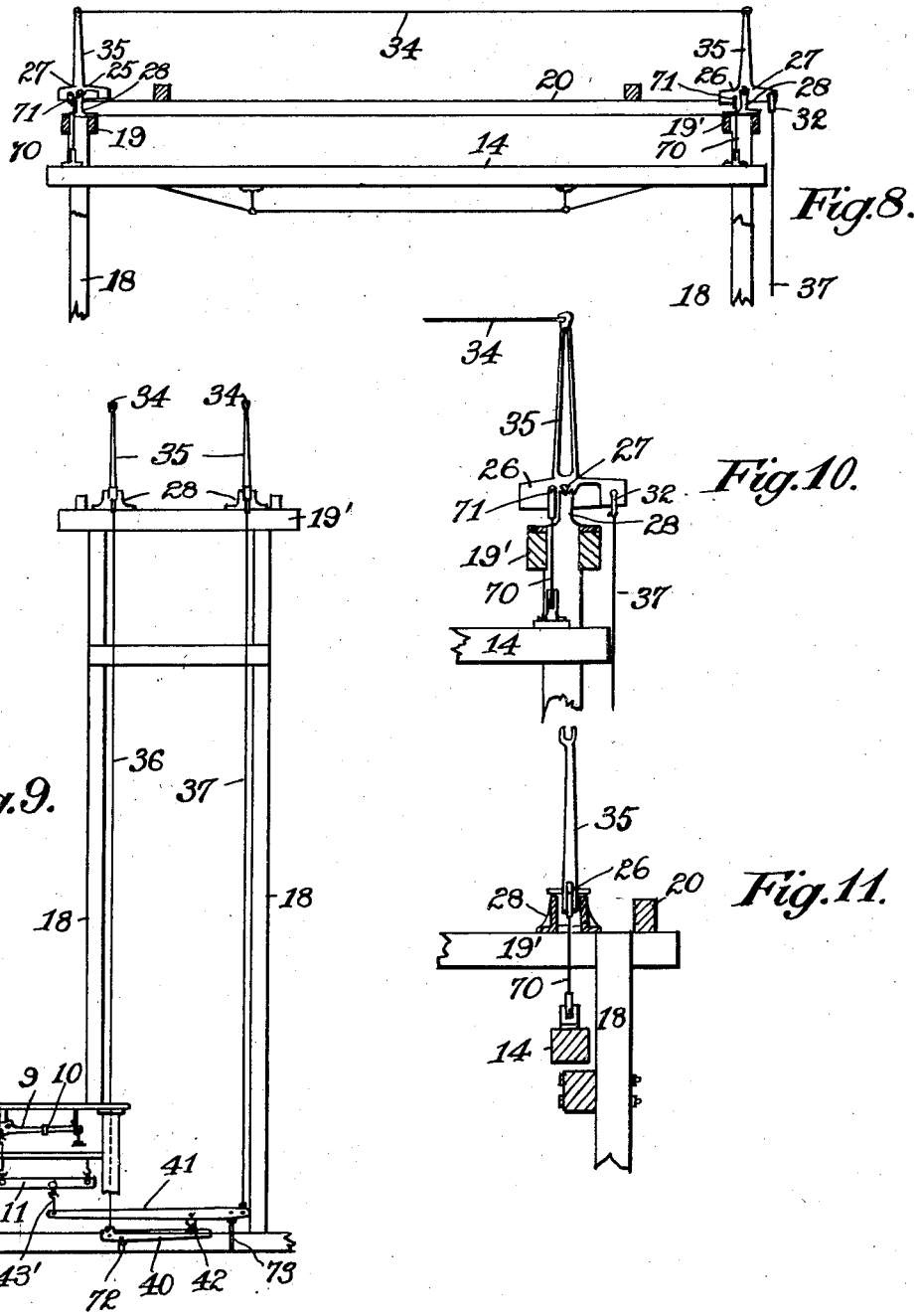

Patented Aug. 18, 1925.

1,550,569

UNITED STATES PATENT OFFICE.

CLAUDE CARTER REASONER, OF HABANA, CUBA, AND HERBERT LANSING MERRICK, OF PASSAIC, NEW JERSEY, ASSIGNORS TO MERRICK SCALE MFG. CO., OF PASSAIC, NEW JERSEY, A CORPORATION OF NEW JERSEY.

COMBINED WEIGHING AND HOISTING APPARATUS.

Application filed April 7, 1921. Serial No. 459,295.

*To all whom it may concern:*

Be it known that we, CLAUDE CARTER REASONER and HERBERT LANSING MERRICK, citizens of the United States, and residents of Habana, Cuba, and Passaic, in the county of Passaic and State of New Jersey, respectively, have invented certain new and useful Combined Weighing and Hoisting Apparatus, of which the following is a specification.

This invention relates to weighing mechanism, and it is the object of the invention to combine with weighing mechanism hoisting and conveying means to lift or hoist a load and transport the load from one point to another, and to weigh the load simultaneously with the lifting and transporting of the same.

The invention is particularly adapted for use in weighing loads during the operation of lifting and conveying or transporting the load from one point to another, as from a cart to a railway car.

In carrying out the invention weighing mechanism is provided including weighing levers, a scale beam and a load support operatively connected to the weighing levers, the load support being arranged with hoisting means to lift a load, as from a cart, and to travel upon the support to transfer the load to another point, as a railway car, the load during the lifting and transferring operation thereof being suspended from the support and weighed.

In the drawings accompanying and forming a part of this specification, Figure 1 is a plan view of weighing mechanism illustrating an embodiment of our invention.

Figure 2 is a side elevation looking at the bottom of Figure 1.

Figure 3 is an end elevation looking at the right of Figures 1 and 2, and partly broken away to illustrate certain features of the invention.

Figure 4 is an enlarged elevational view of one of the supports for the load supporting means.

Figure 5 is a view looking at the left of Figure 4.

Figure 6 is a perspective view showing in a diagrammatic manner the embodiment of the improved weighing mechanism.

Figure 7 is a side elevation of one of the weighing levers shown at the right of Figures 1 and 2, from which the load support is suspended.

Figure 8 is a side elevation of the upper portion of the supporting structure or tower and showing a modified manner of suspending the load supporting means or platform from the weighing levers mounted upon said tower.

Figure 9 is an end elevation showing modified means of operatively connecting the weighing levers mounted upon the supporting structure to the scale or weigh beam of a weighing mechanism.

Figure 10 is an enlarged detail view, partly in section, to illustrate the mounting of the weighing levers upon a supporting structure shown at the right of Figure 8; and Figure 11 is a sectional detail view looking at the right of Figure 10.

Similar characters of reference designate like parts throughout the different views of the drawings.

In Figures 1 to 6 of the drawings there is illustrated an embodiment of the invention comprising a pivotally supported scale-beam 9 having counterpoise weight 10 adjustably mounted thereon and to which beam a pivotally supported weighing lever 11 is connected by a link 12, the connected lever and scale-beam being enclosed in a housing 13 as usual, Figure 3. The lever 11 has operatively connected thereto load receiving or supporting means, shown as a platform substantially of rectangular shape and suspended in a plane above the scale-beam and weighing lever 11. The platform or load support comprises parallel side members 14 connected adjacent opposite ends by transverse members 15, the upper surface of the side members being arranged as tracks, or to have tracks applied thereto, as shown at 16, for a purpose to be hereinafter described.

The platform or load supporting means is supported and suspended from a supporting structure or tower in the form of a bridge consisting of two pairs of pillars 17, 18 connected at their upper ends by transverse members 19 and 19′ and by parallel extending longitudinal members 20 fixed upon the transverse members 19, 19′. The load supporting means is suspended from the supporting structure by lever mechanism comprising two pairs of levers 21, 22 having knife edge pivots 23 (Figures 4 and 5) projecting from opposite sides of the levers substantially midway between the ends thereof and adapted to engage bearings 24 fixed to and projecting up from the side members 14 of the platform adjacent opposite ends thereof. The levers 21 are connected to a pair of levers 25 pivotally supported upon one of the transverse members 19 and the levers 22 are pivotally connected to a pair of levers 26 pivotally supported upon the other transverse member 19'. Each of the levers 25 and 26 have knife edge pivot members 27 projecting from opposite sides thereof at one side of a point midway between the ends, and shown in the drawings at the right of such midway point for a purpose to be hereinafter described, and whereby the levers 25, 26 are supported upon bearing blocks 28 mounted upon the transverse members 19, 19' of the supporting structure.

The platform levers 21, 22 are connected to the levers 25, 26 by links 29 connected at one end to shackles 30 engaged by knife edge pivot members 31 projecting from opposite sides of the levers 21, 22 adjacent opposite ends, and the opposite ends of the links 29 being connected to shackles 32 mounted upon knife edge pivot members 33 extending from opposite sides of the levers 25, 26 adjacent the ends. The levers 25, 26 are interconnected to have synchronous movement, or to impart movement of one lever to the other lever, by rods or cables 34 connected at opposite ends to arms 35 extending upward from the respective levers in line with the pivot members 27.

The load supporting platform is connected to the scale-beam 9 and weighing lever 11 through the levers 26 by means of links 36, 37 connected at one end to shackles 38 mounted upon knife edge pivot members 39 projecting laterally from opposite sides of the end of the levers 26 extended beyond the pivotal connection of the links 29 as clearly shown in Figures 2, 6 and 7. The links 36 are connected to a lever 40 pivotally supported at one end, and the link 37 is pivotally connected to a lever 41 also pivotally supported at one end, said levers having a link connection 42 adjacent their free ends and connected to the weighing lever 11 by a rod or cable 43 connected to the lever 41 and the weighing lever 11, Figure 3.

In the operation of weighing mechanism as described a load supported by the platform due to the locating of one of the pivotal supports 33 at a greater distance from the pivotal supports 27 of the levers 25, 26 than the other of said supports 33, the levers 25, 26 are rocked and the movement of one of said levers is equalized and the levers caused to move in synchronism through the connection 34. The movement of the levers 25, 26 is transmitted to the weighing lever 11 through connection of said lever with the levers 26 by exerting an upward pull upon the lever 11, and the movement of the latter lever is transmitted to the scale-beam, the load on the load supporting platform being brought to equilibrium with the scale-beam by the adjustment of the counterpoise weight upon the scale-beam.

As stated it is an object of the invention to combine with weighing mechanism means to lift or elevate a load and also to transport a load from one point to another during the weighing of the load; as, for instance, the transferring of sugar cane from a cart 44 to a railway car 45 (Figure 2) and to weigh the cane during the lifting and transferring thereof. For this purpose the load supporting platform is made of rectangular open frame structure, the side members 14 of which are provided with tracks 16 upon which is mounted a load carrying carriage (designated in a general way by C) to have movement along the platform. This carriage is moved along the platform by a cable 46 connected at one end, as at 47, to one end of the carriage and passing around sheaves 48, 49 rotatably supported at opposite ends of the platform, and connected at the opposite end to the opposite end of the carriage, as at 50. Movement is imparted to the carriage by a cable 51 passing around the sheave 49, which is in the nature of a double sheave, and a sheave 52. It will be obvious that by moving the cable 51 in one direction movement will be imparted to the sheave 49 moving the carriage in one direction, and by imparting reverse movement to the cable 51 the carriage will travel in an opposite direction.

To lift or elevate the load hoisting means is provided. including a pair of cables 54, 55 one end of each cable being fixed to the support 14, as at 56, 57, (Figures 2 and 6,) and passing over sheaves 58 and 59 rotatably mounted on the wheel axles of the carrier C with a looped portion of the cables 54', 55' between said sheaves, the looped portion passing around idler sheaves carried by such looped portions, as shown at 59', Figure 2. The cables then pass around sheaves 60 journaled at the end of the supporting platform opposite to which the cables 54, 55 are connected and sheaves 61 rotatably supported by the supporting structure adjacent the end of the platform to which the cables 54, 55 are connected, and sheaves 62 rotatably supported adjacent the lower end of the supporting structure with the ends connected to the drum of a winch operated from a suitable source of power. As any well known winch mechanism and power means, such as a gas or steam engine, may be used for this purpose illustration and description of the same is not deemed necessary. The load is supported from the sheaves 59' by suitable means and shown in the present instance as a chain sling 62.

In operation, assuming the parts to be in the position shown in Figures 1 and 2, the carriage is adjusted along the platform to position with the looped cables 54' 55', shown in dash line position in Figure 2, above the cart 44, when the cables 54, 55 are slackened until the chain sling is in position to be placed about a bundle of cane loaded onto the cart. After the sling has been secured the cables 54, 55 are taken up by the winch thereby lifting or elevating the load or bundle of cane clear of the cart and the adjacent railway car 45, and by the manipulation of the cable 51 the carriage is adjusted to position above the railway car, as shown in Figure 2, when the chain sling is released and the cane falls into the car. It will be noted that the carriage C and the load carried thereby during the lifting and transporting of the same is mounted upon the platform, and during this manipulation of the load it is weighed, the weight of the load carried by the platform actuating the scale-beam 9 and the load being counterbalanced or brought to equilibrium by the adjusting of the counterpoise weight upon the beam. It will be noted that the pull upon the lifting cables is in a direction toward one end or longitudinally of the platform, and to prevent end movement of the platform in the direction of the pull and swaying thereof, a pair of cables 63 are secured at one end to the platform, as shown at 64, Figure 6, and the other ends fastened to the supporting structure, as at 65, Figure 2.

In a combined hoisting and weighing mechanism as described the weight which is indicated on the weigh or scale-beam 9 is the sum of the forces acting thereon through the means by which the supporting platform is suspended from the levers 25, 26. As such suspension means must hang plumb the only forces on the platform which can act to increase or decrease the pull on the suspension are those which act parallel to such suspension means in a vertical direction, and with the floating support or platform in equilibrium the sum of the forces acting upward must be equal to the sum of the forces acting downward. Therefore, by the arrangement of the lifting cables 54, 55, that is the fastening of such cables to one end of the platform 14, passing the same around the sheaves 16 and the mounting of such sheaves directly upon the platform to participate in the deflecting movement thereof, and then by passing said cables over the sheaves 61 mounted upon the supporting structure at the side adjacent the end at which the cables are fastened to the platform, any pull or strain upon such cables during the operation of lifting and transporting a load will not interfere with the bringing of the load carried by said cables and supported by the platform into equilibrium with and indicating the correct weight thereof upon the scale-beam. Furthermore, by the arrangement of elevating or hoisting means described there is no pull on the cables 54, 55 at an inclination from the carriage C to the sheaves 61 which would tend to lift a portion of the load away from the platform and thereby interfere with the accurate weighing of a load being lifted and transported. Furthermore, by the arrangement described the stretch of the cables between the sheaves 60 and 61 always retains the same path no matter what the deflection of the platform may be with the result that the pull upon the lifting cables 54, 55 is always in a substantial horizontal direction and any pull upon such cables will not exert a vertical pull upon the platform and its suspension means thereby interfering with the accurate weighing of a load.

In the modification shown in Figures 8 to 11, inclusive, of the drawings the platform 14 is supported from the levers 25, 26 by links 70 pivotally connected adjacent opposite ends of the platform and supported from pivots 71 projecting laterally from opposite sides of the levers 25, 26, these pivots being located at a point between the pivotal support 27 of said levers and the left hand end thereof as viewed from Figure 8. In connecting the levers 25, 26 to the scale-beam 9 of the weighing mechanism instead of supporting the intermediate weighing levers 40, 41 upon the frame of the supporting structure these levers are anchored at the base of the pillars 18 of the supporting structure as shown at 72 and 73, the lever 41 being connected to the weighing lever by a link 43'. The operation of the arrangement described and illustrated in Figures 8 to 11 is substantially the same as that described in connection with the structure disclosed by Figures 1 to 6.

While there has been described and illustrated in the drawing specific means and arrangement of parts to carry out the invention it is to be understood that various changes may be resorted to without departing from the scope of the invention, and that portions of the invention may be used without others.

Having thus described the invention what is claimed is:

1. Weighing mechanism comprising two pairs of weighing levers, means to connect one pair of levers, whereby both pairs of levers will move in synchronism, a load support including a track suspended from and between said levers, means to lift and transport a load including a carriage supported upon and movable along the track of the load support and simultaneously with the lifting and transporting of the load along the load support weighing the same, and a scale mechanism connected to and operative from one pair of levers to indicate the weight of the load.

2. Weighing mechanism including a scale beam and a load supporting platform, lever mechanism to suspend the platform in a plane above the scale beam, means to connect the lever mechanism to the scale beam, and means mounted on the platform to hoist and move a load along the platform during the weighing thereof for the purpose specified.

3. The combination in weighing mechanism, of a scale beam, a load supporting platform, a supporting structure from which to suspend the platform in a plane above the scale beam; levers pivotally mounted upon the platform; means to connect said levers to the scale beam; levers pivotally mounted upon the supporting structure; means to connect said latter levers to the platform levers to suspend the platform levers and platform therefrom; and means to lift a load from the platform and simultaneously weigh the same.

4. In weighing mechanism, the combination of a supporting structure, a load supporting platform, interconnected levers fulcrumed upon the supporting structure, means to connect and support the platform from opposite ends of said levers, the fulcrumed support of said levers being at one side of a point midway between the connection thereof with the platform, and scale mechanism connected to one end of said levers beyond the connection of the platform with the shorter arm of said levers to indicate the weight of the load supported by the platform.

5. In weighing mechanism, the combination of a scale beam; a platform; a supporting structure for the platform; levers from which the platform is suspended midway between their ends; and levers connected to the scale beam and the platform levers pivotally mounted upon the supporting structure at one side of a point midway between the connection thereof with the platform suspension levers for the purpose specified.

6. In weighing mechanism, the combination of a scale beam; a platform; a supporting structure for the platform; and means to suspend the platform from the supporting structure and operatively connect the same with the scale beam, comprising levers pivotally mounted upon the platform midway between the ends thereof, levers having a connection with each other and with the scale beam pivotally mounted upon the supporting structure at one side of a point midway between the ends of the levers, and a connection between said levers and the platform levers for the purpose specified.

7. In weighing mechanism, the combination of a scale beam; a platform; a supporting structure for the platform; and means to suspend the platform from the supporting structure and operatively connect the same with the scale beam, comprising levers pivotally mounted midway between their ends, levers having connection with the scale beam pivotally mounted upon the supporting structure at one side of a point midway between the ends thereof, means to connect said latter levers to have synchronous movement, and a link connection between the ends of said levers and the platform levers for the purpose specified.

8. In weighing mechanism, the combination of a scale beam; a substantially rectangular platform; a supporting structure from which the platform is suspended in a plane above the scale beam; and means to suspend the platform from the supporting structure comprising levers pivotally mounted midway between the ends thereof adjacent opposite ends of the platform; companion levers pivotally mounted upon the supporting structure at one side of a point midway between the ends and having connection with each other for synchronous movement, means to connect said levers to the scale beam, and a link connection between the ends of said levers and the platform levers for the purpose specified.

9. In weighing mechanism, the combination of a scale beam, interconnected levers pivotally supported at one side of a point between their ends and having connection with the scale beam, a platform suspended from said levers, and means to elevate a load supported by the platform for the purpose specified.

10. In weighing mechanism, the combination of a supporting structure, a scale beam, a platform, means to suspend the platform from the supporting structure and operatively connect the same to the scale beam, a carriage movable along the platform, and means associated with the carriage to elevate a load suspended from the carriage and move the carriage to transport the elevated load suspended therefrom along the platform and weigh the load during said elevating and transporting thereof.

11. The combination with weighing mechanism, of means to hoist a load during the weighing thereof, comprising levers operatively connected to the weighing mechanism, a load supporting platform suspended from said levers, a cable fastened to one end of the platform, a pair of sheaves carried by the platform over which said cable passes with a looped portion of the cable between said sheaves and by which looped portion the load is carried, a sheave at the end of the platform opposite to the end at which the cable is fastened and over which the cable passes, a sheave supported independent of the platform adjacent the end thereof to which the cable is fastened, and a hoisting winch to which the opposite end of the cable is connected.

12. The combination with scale mechanism to indicate the weight of a load, of means to hoist a load during the weighing thereof, comprising a supporting structure; load supporting means suspended therefrom and operatively connected to the scale mechanism; and hoisting means to elevate a load supported by said load supporting means comprising a pair of cables fastened at one end to one end of the load supporting means, two pairs of sheaves mounted upon the load supporting means each cable passing over a pair of said sheaves with a looped portion of the cables between said sheaves, a pair of sheaves and by which the load is carried at the end of the load supporting means opposite to the end at which the cables are fastened and over which the cables pass, sheaves rotatably mounted upon the supporting structure at the end of the load supporting means at which the cables are fastened; and a winch to which the opposite ends of the cables are connected.

13. The combination with weighing mechanism, of a supporting structure; a load support suspended from said structure and operatively connected to the weighing mechanism; and hoisting means to elevate and transport a load supported by said load support during the weighing of the load comprising a carriage movably mounted upon the load supporting means, a pair of cables fastened at one end to one end of the load support, two pairs of sheaves mounted upon the carriages over which the cables pass with a looped portion of the cables between said sheaves, a pair of sheaves at the end of the load support opposite to the ends at which the cables are fastened and over which sheaves the cables pass; a pair of sheaves rotatably mounted upon the supporting structure at the end of the load support at which the one end of the cables are fastened, and a winch to which the other ends of the cables are connected.

14. The combination with weighing mechanism, of a supporting structure, a load support pivotally suspended from said structure and operatively connected to the weighing mechanism, hoisting mechanism to elevate a load suspended from the support and transport the elevated load along the support, said weighing mechanism being adapted to weigh the load as it is elevated and transported along the load support, and means connected to one end of the load support and with the supporting structure at the opposite end of the load support to prevent swaying of the load support during the elevating and transporting of the load suspended from the load support.

15. In weighing mechanism, the combination with a scale beam, of a supporting structure; levers fulcrumed upon said structure and operatively connected to the scale beam; a load supporting platform suspended from said levers; and hoisting means including a tackle mounted upon the platform to elevate the load supported by the platform during the weighing thereof, said tackle to exert a pull in a direction horizontally of the platform during the elevating of the load without exerting a vertical pull upon the platform for the purpose specified.

16. The combination with weighing mechanism, of load supporting levers fulcrumed at a point between their ends and having an operative connection with the weighing mechanism to influence the latter by a load supported by the levers, each of said levers having an arm extending therefrom in line with its fulcrumed support, and means connected to the lever arms to interconnect the levers for the purpose specified.

Signed at the city of New York, in the county of New York and State of New York, this 24th day of March, 1921.

CLAUDE CARTER REASONER.
HERBERT LANSING MERRICK.